United States Patent
Robert et al.

(10) Patent No.: US 10,476,045 B2
(45) Date of Patent: Nov. 12, 2019

(54) EXTRUDED BATTERY CASE

(71) Applicant: FORD GLOBAL TECHNOLOGIES, LLC, Dearborn, MI (US)

(72) Inventors: Brian Joseph Robert, Saint Clair Shores, MI (US); Kent Snyder, Dearborn, MI (US); Renata Michaela Arsenault, Plymouth, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 503 days.

(21) Appl. No.: 15/049,470

(22) Filed: Feb. 22, 2016

(65) Prior Publication Data

US 2017/0244072 A1    Aug. 24, 2017

(51) Int. Cl.
| | |
|---|---|
| H01M 2/02 | (2006.01) |
| H01M 10/625 | (2014.01) |
| H01M 10/6556 | (2014.01) |
| H01M 10/6554 | (2014.01) |
| H01M 2/10 | (2006.01) |
| H01M 10/04 | (2006.01) |

(52) U.S. Cl.
CPC ........ *H01M 2/024* (2013.01); *H01M 2/1077* (2013.01); *H01M 10/0431* (2013.01); *H01M 10/625* (2015.04); *H01M 10/6554* (2015.04); *H01M 10/6556* (2015.04); *H01M 2220/20* (2013.01)

(58) Field of Classification Search
None
See application file for complete search history.

(56) References Cited

U.S. PATENT DOCUMENTS

| | | | |
|---|---|---|---|
| 6,833,010 B2 | 12/2004 | Asahina et al. | |
| 6,858,344 B2 | 2/2005 | Marukawa et al. | |
| 8,298,700 B2 * | 10/2012 | Asahina | B60L 3/0046 |
| | | | 429/143 |
| 8,524,387 B2 | 9/2013 | Graaf et al. | |
| 8,703,316 B2 | 4/2014 | Motohashi | |
| 8,709,632 B2 * | 4/2014 | Kim | H01M 2/0237 |
| | | | 429/163 |
| 2009/0173559 A1 | 7/2009 | Nakamura | |
| 2012/0060361 A1 * | 3/2012 | Reis | H01M 2/0262 |
| | | | 29/623.5 |
| 2015/0270514 A1 * | 9/2015 | Baek | H01M 2/1061 |
| | | | 429/151 |

FOREIGN PATENT DOCUMENTS

| | | |
|---|---|---|
| DE | 102013002152 | 8/2014 |
| EP | 2148385 | 1/2010 |
| WO | 2012110168 | 8/2012 |
| WO | WO2015050281 | * 4/2015 |

\* cited by examiner

*Primary Examiner* — Christopher P Domone
(74) *Attorney, Agent, or Firm* — Carlson, Gaskey & Olds, P.C.

(57) ABSTRACT

An exemplary battery cell assembly includes, among other things, an extruded case that provides an open area, and an electrode of a battery pack of an electrified vehicle. The electrode is held within the open area. An exemplary electrode housing method includes, among other things, positioning an electrode of an electrified vehicle battery pack within an open area of an extruded case.

20 Claims, 9 Drawing Sheets

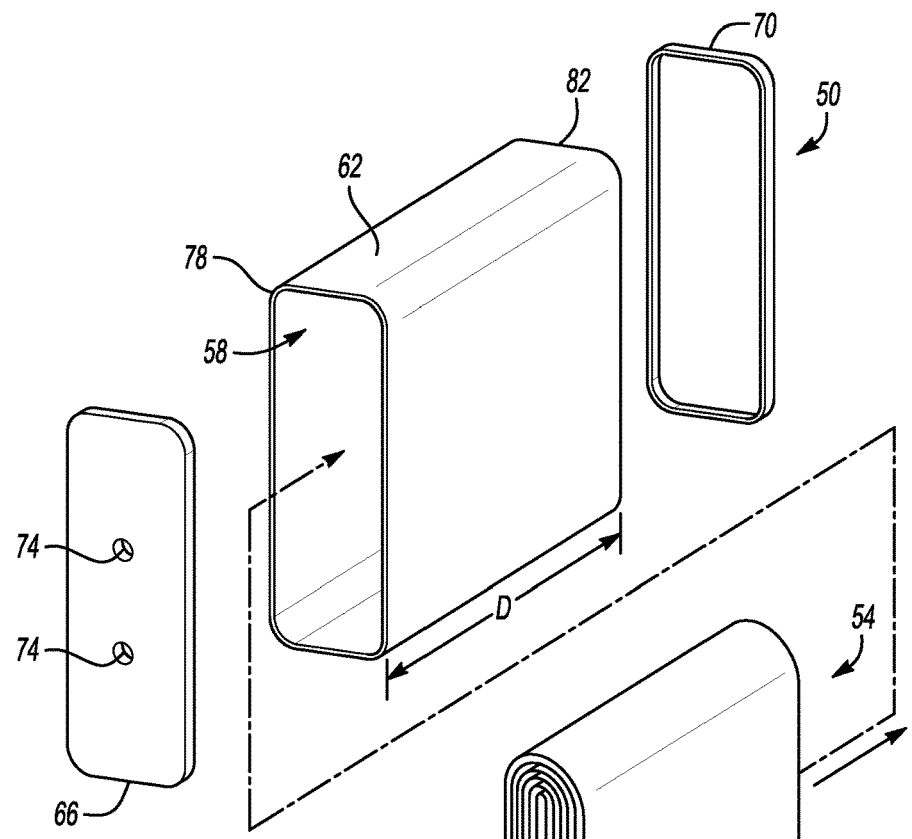
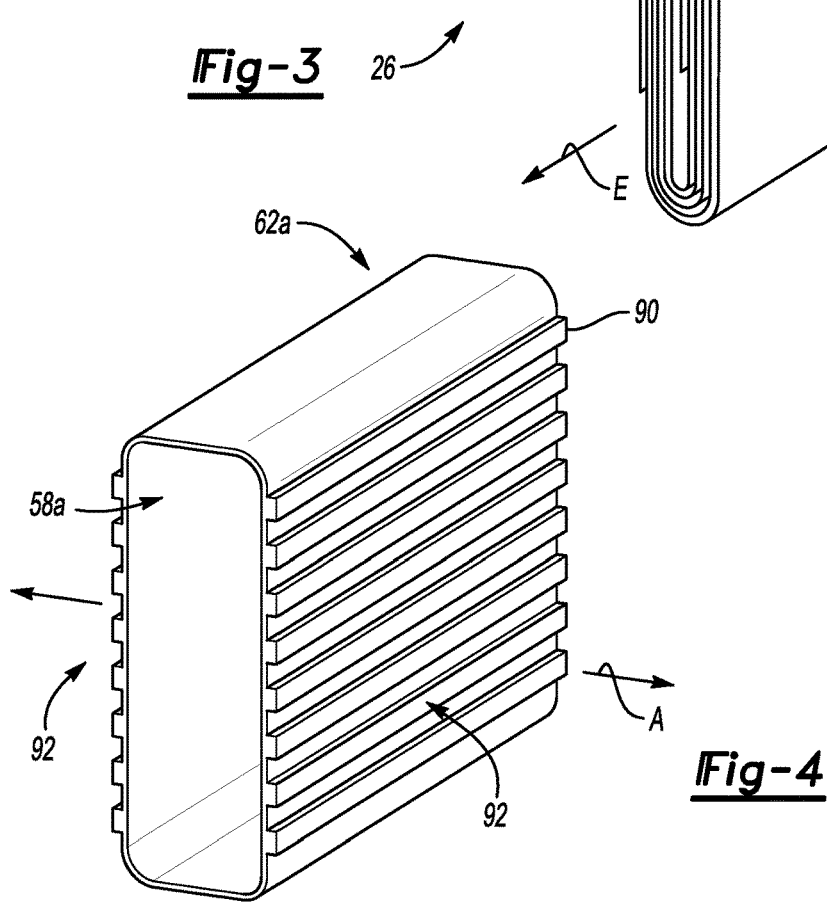

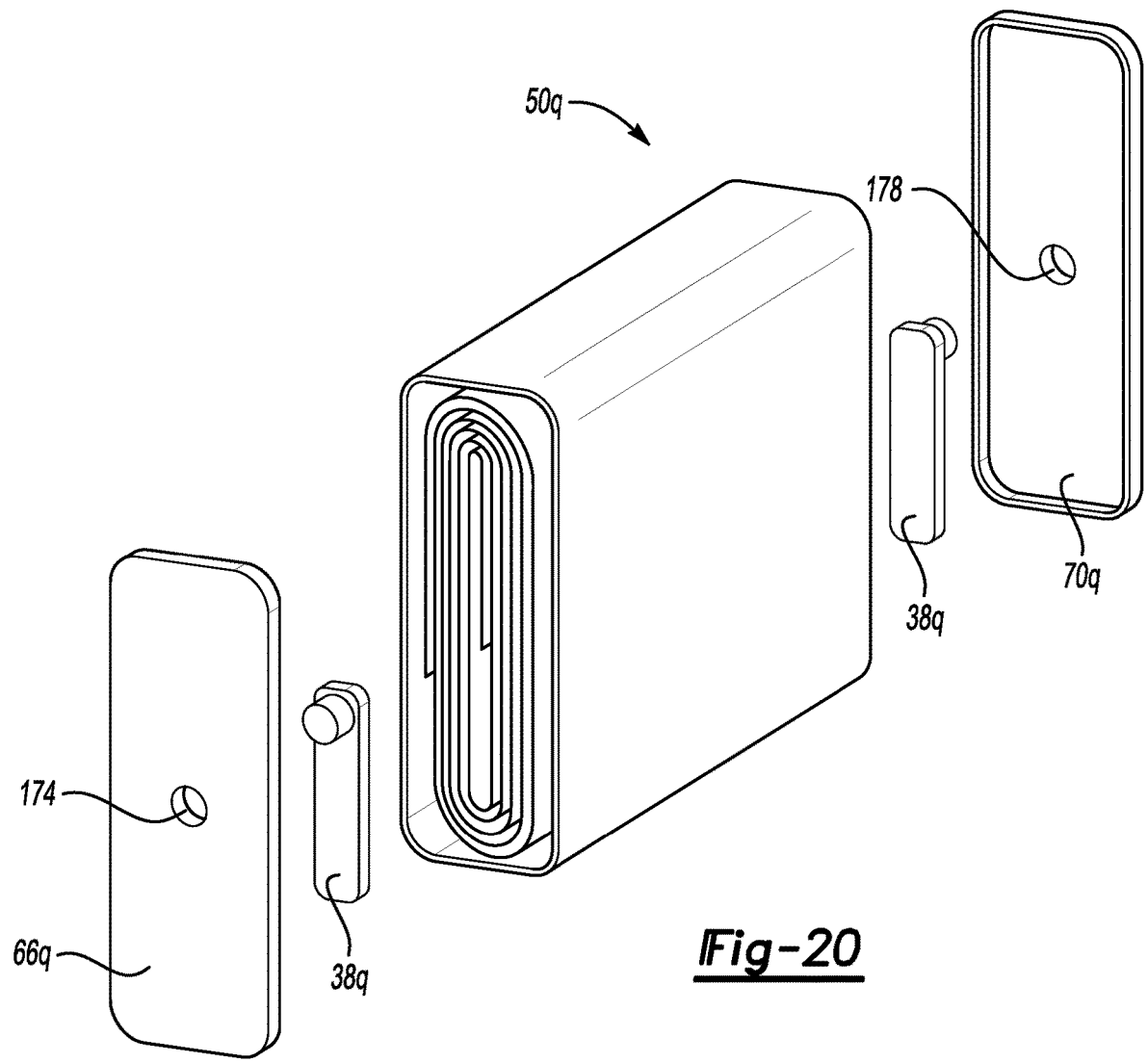

EXTRUDED BATTERY CASE

TECHNICAL FIELD

This disclosure relates generally to a battery assembly for an electrified vehicle battery pack and, more particularly, to an extruded battery case of the battery assembly.

BACKGROUND

Electrified vehicles differ from conventional motor vehicles because electrified vehicles are selectively driven using one or more electric machines powered by a battery pack. The electric machines can drive the electrified vehicles instead of, or in addition to, an internal combustion engine. Example electrified vehicles include hybrid electric vehicles (HEVs), plug-in hybrid electric vehicles (PHEVs), fuel cell vehicles (FCVs), and battery electric vehicles (BEVs).

Battery packs of electrified vehicles typically include a plurality of individual battery assemblies each having one or more electrodes. Terminals extend from the battery assemblies to electrically connect the electrodes to a bus bar, for example. Some battery packs include features separate from the battery assemblies that are used to align and retain the battery assemblies, move fluids, and maintain structural integrity over time.

SUMMARY

A battery assembly according to an exemplary embodiment of the present disclosure includes, among other things, an extruded case that provides an open area, and an electrode of a battery pack of an electrified vehicle. The electrode is held within the open area.

In another example having one or more features of the foregoing assembly, the extruded case includes an alignment feature configured to interface with a distinct portion of the battery pack to limit movement of the extruded case relative to the distinct portion.

In another example having one or more features of any of the foregoing assemblies, the battery assembly includes a plurality of extruded cases. The alignment feature is a first alignment feature of a first one of the extruded cases, and the distinct portion of the battery pack is a second alignment feature of a second one of the extruded cases.

In another example having one or more features of any of the foregoing assemblies, the battery assembly includes an endplate and the distinct portion of the battery pack is an alignment feature of the endplate In another example having one or more features of any of the foregoing assemblies, the alignment feature extends from an outer surface of the extruded case that faces away from the open area. The alignment feature has an alignment surface that is transverse to the outer surface and interfaces with the distinct portion.

In another example having one or more features of any of the foregoing assemblies, the battery assembly includes a plurality of the extruded cases disposed along an axis of the battery pack. The alignment feature extends from a surface of the extruded case that faces in a direction of the axis.

In another example having one or more features of any of the foregoing assemblies, the extruded case is disposed with other extruded cases along an axis of the battery pack. The alignment feature extends from a surface of the extruded case that is transverse to the axis.

In another example having one or more features of any of the foregoing assemblies, the alignment feature is first alignment feature on a first axial side of the extruded case and the extruded case further comprises a second alignment feature on a second axial side of the extruded case. The first alignment feature is asymmetrical with the second alignment feature.

In another example having one or more features of any of the foregoing assemblies, the extruded case establishes a conduit feature configured to provide at least a portion of a conduit that carries a temperature management fluid within the battery pack.

In another example having one or more features of any of the foregoing assemblies, the conduit feature extends from an outer surface of the extruded case that faces away from the open area. The conduit feature has a conduit surface that is transverse to the outer surface and is configured to directly contact the temperature management fluid.

In another example having one or more features of any of the foregoing assemblies, the electrode is folded and wound about an electrode axis, and the extruded case is extruded in a direction aligned with the electrode axis.

In another example having one or more features of any of the foregoing assemblies, a first header is secured to a first end portion of the extruded case, and a second header is secured to an opposing, second end portion of the extruded case.

In another example having one or more features of any of the foregoing assemblies, the extruded case comprises an electrode positioning feature extending into the open area and configured to align the electrode.

An electrode housing method according to another exemplary aspect of the present disclosure includes, among other things, positioning an electrode of an electrified vehicle battery assembly within an open area of an extruded case.

Another example having one or more features of the foregoing method, includes securing a first header to a first end portion of the extruded case, and securing a second header to an opposing second end portion of the extruded case to substantially enclose the electrode within the open area.

Another example having one or more features of any of the foregoing methods, includes seating and positioning of the extruded case relative to a distinct portion of a battery pack using an alignment feature of the extruded case.

Another example having one or more features of any of the foregoing methods, includes channeling a temperature management fluid within a battery pack using a conduit that is at least partially provided by a conduit feature of the extruded case.

Another example having one or more features of any of the foregoing methods, includes constraining of the electrode within the open area using an electrode positioning feature that extends into the open area.

Another example having one or more features of any of the foregoing methods, includes winding the electrode to provide a jelly-roll configuration of the electrode prior to the positioning.

BRIEF DESCRIPTION OF THE FIGURES

The various features and advantages of the disclosed examples will become apparent to those skilled in the art from the detailed description. The figures that accompany the detailed description can be briefly described as follows:

FIG. 3 shows an exploded view of a battery cell from the battery pack of FIG. 2 and incorporating an extruded case.

FIG. 4 shows another example extruded case for use in the battery cell of FIG. 3.

FIG. 20 shows a perspective exploded view of another example battery cell having a terminal extending through a header on a first lateral side and another terminal extending through another header on an opposing lateral side.

DETAILED DESCRIPTION

This disclosure relates generally to a battery assembly for an electrified vehicle battery pack. The battery assembly includes an extruded case. In some examples, the extruded case incorporates extruded features that aid in retaining and aligning a battery assembly relative to other structures. In other examples, the extruded case includes extruded features facilitating the flow of a temperature management fluid.

Figure 1:
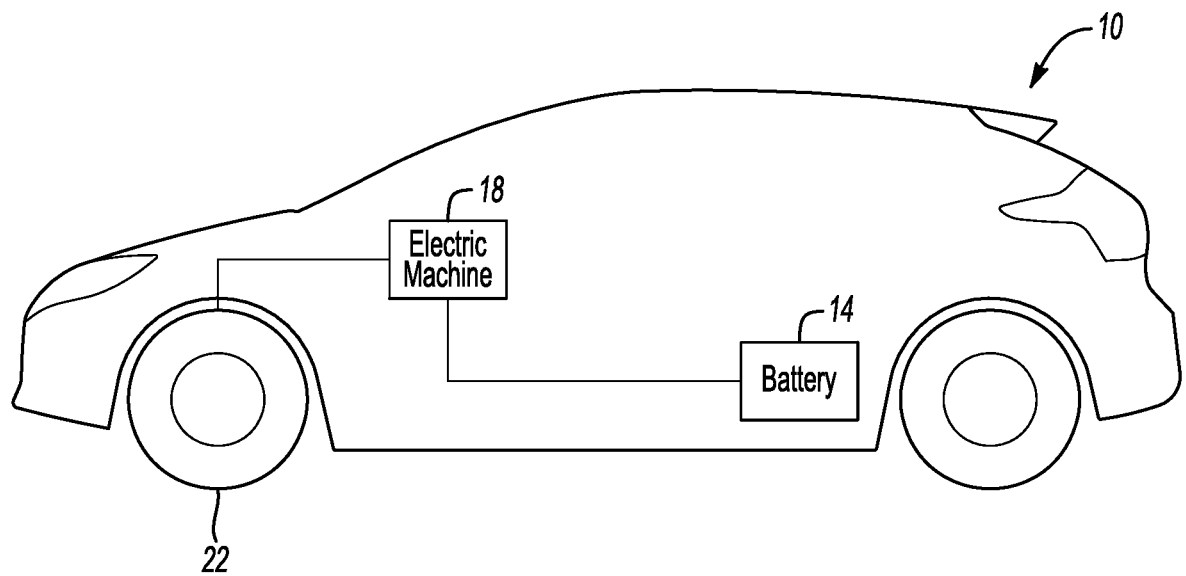
FIG. 1 shows a schematic side view of an example electric vehicle.

Referring to FIG. 1, an example electrified vehicle 10 includes a battery 14, an electric machine 18, and a pair of vehicle drive wheels 22. The electric machine 18 can receive electric power from the battery 14. The electric machine 18 converts the electric power to torque that drives the wheels 22. The illustrated battery 14 comprises a relatively high voltage traction battery in some embodiments.

The exemplary vehicle 10 is an all-electric vehicle. In other examples, the electrified vehicle 10 is a hybrid electric vehicle, which can selectively drive the wheels 22 with torque provided by an internal combustion engine instead of, or in addition to, the electric machine 18.

Figure 2:
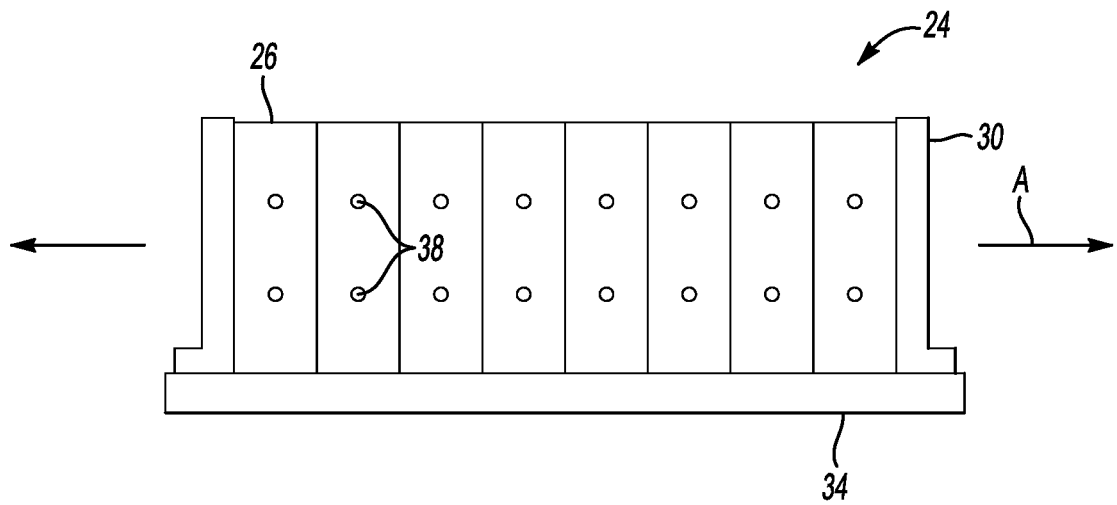
FIG. 2 shows a battery pack from the vehicle of FIG. 1.

Referring now to FIG. 2 with continuing reference to FIG. 1, an array 24 of the battery 14 includes a plurality of individual battery cells 26 disposed along an axis A and sandwiched axially between endplates 30. The battery 14 can include the array 24 and several other arrays. The array 24 is considered a module or a stack in some examples.

The battery cells 26 and endplates 30 are disposed on a heat exchanger plate 34. The battery cells 26 include prismatic Li-ion cells in this example.

The battery cells 26 include terminals 38 that electrically couple the individual battery cells 26 to a bus bar, or some other structure, to transfer electrical power to and from the battery cells 26. In this example, the terminals 38 extend from a lateral side of the array 24. In other examples, some or all of the terminals 38 are positioned in another area, such as at a vertical top of the array 24.

Referring now to FIG. 3 with continuing reference to FIG. 2, an example battery cell 26 includes a battery cell housing 50 that holds an electrode 54. The battery cell housing 50 provides an open area 58 that holds at least one electrode 54. In another example, the open area 58 holds other electrodes in addition to the electrode 54.

The example electrode 54 is a multilayered structure including a cathode layer, an anode layer, an isolation barrier, and an insulating barrier. The electrode 54 is folded and wound about an electrode axis E to provide a jelly-roll electrode structure. In other examples, the electrode 54 is stacked, wound, or both.

The battery cell housing 50 includes an extruded case 62, a first header 66, and a second header 70. The extruded case 62 provides the open area 58 of the battery cell housing 50 that receives the electrode 54. The extruded case 62 is sometimes considered an extruded tube, extruded sleeve, or an extruded can. To enclose the electrode 54 within the open area 58, the first header 66 is secured to a first end portion of the extruded case 62, and the second header 70 is secured to an opposing, second end portion of the extruded case 62.

In this example, the first header 66 includes apertures 74. The terminals 38 extend through the apertures 74 to the electrode 54 (see FIG. 2) to facilitated an electrically conductive connection with the electrode 54.

The extruded case 62 is formed using an extrusion process. During an example extrusion process, a material is pushed through a die to form a cross-sectional profile of the extruded case 62. The material of the extruded case 62 can be aluminum, or another material suitable for an extrusion process.

The extruded case 62 is then cut from the material that has been pushed through the die. The extruded case 62 is cut from the material at a side 78 and an opposing side 82. A dimension D of the extruded case 62 is in the direction of extrusion. As can be appreciated, the dimension D of the extruded case 62 is based on where the side 78 is cut relative to the side 82. The locations of the cuts can be changed if an extruded case with an increased or decreased dimension D is desired. The same die and other extrusion tooling can thus be used to create a plurality of extruded cases each having different dimensions D. In the past, battery cell housings that were fabricated using deep draw techniques required significant tooling changes to alter a distance in the direction of draw.

The electrode 54 is placed in the open area 58 such that the axis E is aligned with the direction of extrusion. In another example, the electrode could be placed in the open area such that the axis E is transverse to the direction of extrusion.

The first header 66 and the second header 70 can be secured to the extruded case 62 by welding, or another attachment technique, such as crimping. The first header 66 and the second header 70 are aluminum in this example, but could be made from other materials. The first header 66 and the second header 70 may be the same material as the extruded case 62, or a different material than the extruded case 62. The first header 66 and the second header 70 can be cast or machined into a desired dimension.

In the following portion of this disclosure, like reference numerals designate like elements where appropriate and reference numerals with the addition of a letter designate modified elements that are understood to substantially incorporate the same features and benefits of the corresponding elements described above except where noted otherwise.

Referring now to FIG. 4, another example extruded case 62a includes a plurality of features 90 that are extruded together and integrated with the remaining portions of the extruded case 62a. The example features 90 have a rectangular profile. The extrusion process allows features 90 of many different profiles or orientations, such as triangular features, grooves, hemispherical ribs, etc.

The example features 90 of the extruded case 62a are disposed upon and protrude from each of the opposing axially facing sides 92 of the extruded case 62a. The features 90 extend from the open area 58a provided by the extruded case 62 in the direction of the battery assembly axis A.

The example features 90 can be alignment features, conduit features, or both. When the extruded case 62a is positioned within an array of a battery pack, the features 90 interface with another portion of the battery pack to provide a desired spacing between adjacent cases 62a, to align and retain the cases 62a in a desired configuration, to facilitate communication of temperature management fluid, or some combination of these. The other portion is distinct from the features 90 and the extruded case 62a. For example, the features 90 can interface with corresponding alignment features on an axially adjacent extruded case within the battery pack to provide a desired spacing between the extruded case 62a and the extruded case of the axially adjacent battery assembly. The spacing could be used as a conduit or channel that carries or directs a flow of fluid, such as a coolant, which is used for temperature management. In the past, discrete spacers separate from the battery cell housings were required to provide such space.

Within the array, the battery assemblies are compressed axially between the endplates 30. The features 90 of the extruded case 62a can contact portions of an axially adjacent structure to impart compressive forces along the axis A to the axially adjacent structure, such as another extruded case or one of the endplates. The features 90 can also enhance the structural integrity of the extruded case 62a by limiting relative movement of the extruded case 62a within the array. In the past, discreet spacers separate from the battery cell housings were required to impart compressive forces along the axis A.

FIGS. 5 to 10 show section views of example extruded cases 62b-62g incorporating respective exemplary features 90b-90g, and how the features 90b-90g interface with other distinct portions of a battery pack. The features 90b-90g have been exaggerated and magnified for drawing clarity.

Figure 5:
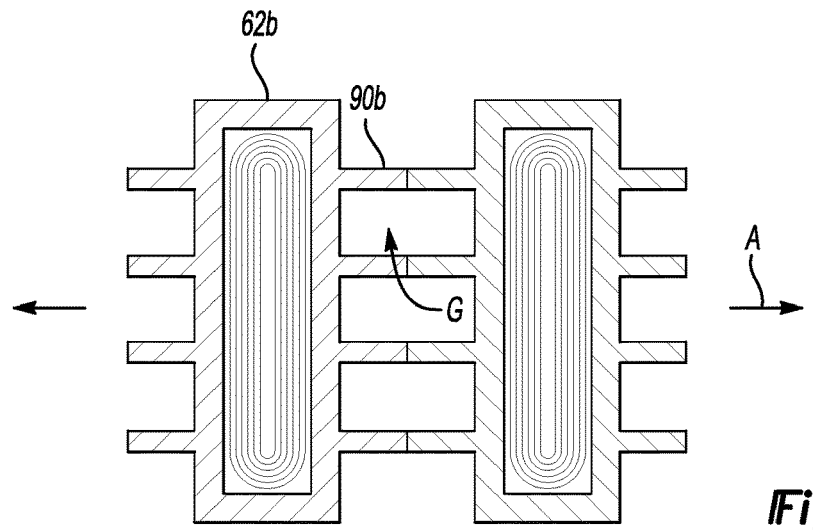
FIG. 5 shows a section view of two axially adjacent battery cells according to another example embodiment.

In the example of FIG. 5, the features 90b of the extruded case 62b interface with each other within an array of a battery pack to provide a desired axial spacing between extruded cases 62b. Gaps G resulting from the axial spacing could be used to communicate a temperature management fluid, such as air, through the battery pack for temperature management. The features 90b on a first axial side of the extruded case 62b are symmetrical with the features 90b on an opposing, second axial side of the extruded case 62b.

Figure 6:
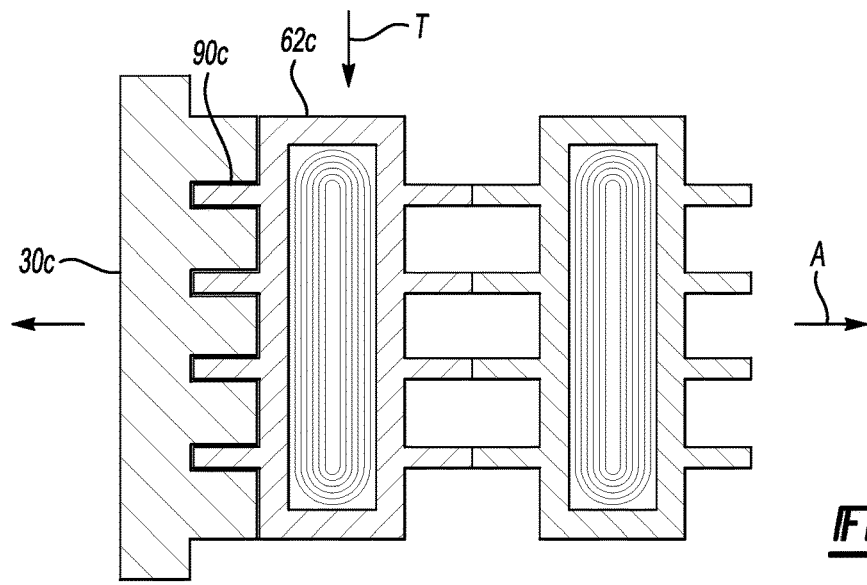
FIG. 6 shows a section view of two axially adjacent battery cells according to another exemplary embodiment.

In the example of FIG. 6, the features 90c on a first axial side of the extruded case 62c are symmetrical with the features 90c on an opposing, second axial side of the extruded case 62c. The features 90c on a first axial side of the extruded case 62c, provide a desired axial spacing between extruded cases 62c. On an opposing, second axial side of at least one of the extruded cases 62c, the features 90c interconnect to the endplate 30c of the array of the battery pack. Interconnecting the alignment features 90c to the endplates 30c at axial ends of the array can limit movement of the associated extruded case 62c relative to the endplate 30c in a direction T that is transverse to the axis A (e.g., vertical according to the drawing). In this example, the features 90c are ribs that are received within corresponding grooves of the endplate 30c. In another example, ribs could extend from the endplate 30c into grooves within the extruded case 62c.

Figure 7:
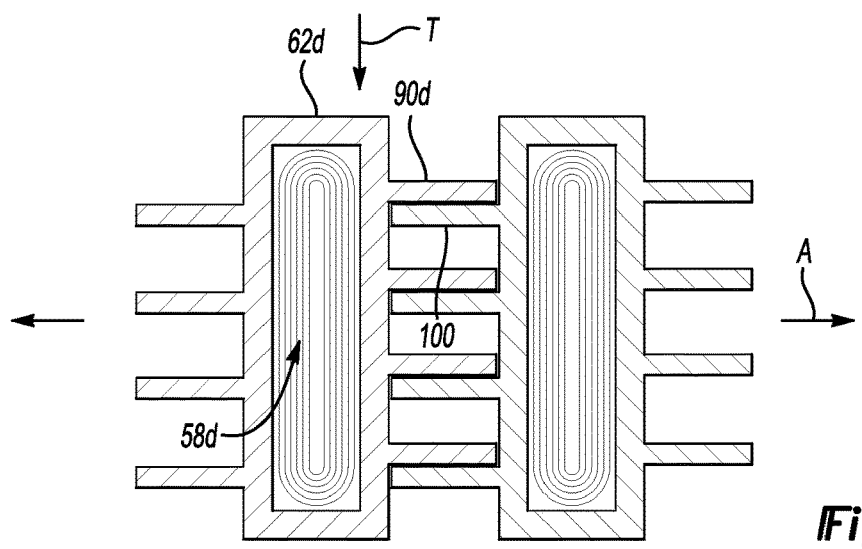
FIG. 7 shows a section view of two axially adjacent battery cells according to another exemplary embodiment.

In the example of FIG. 7, the features 90d on a first axial side of the extruded case 62d are asymmetrical from the features 90d on an opposing, second axial side of the extruded case 62d. That is, the features 90d on a first axial side are offset and have a different position from the features 90d on an opposing, second axial side. Because the features 90d are asymmetrical, the extruded case 62d is designed to fit within the array in one orientation, which can facilitate correctly positioning the extruded case 62d within the array during assembly. When positioned within the array, the features 90d axially overlap corresponding features of an axially adjacent extruded case 62d. In other examples, the features 90d are received within a corresponding groove of the axially adjacent extruded case 62d. The features 90d extend axially from a surface of the extruded case 62d that faces away from the open area 58d of the extruded case 62d. The features 90d include a surface 100 facing in a direction transverse T to the axis A (e.g., upward in the drawing) and the surface of the extruded case 62d from which the features 90d extend. The surface 100 interfaces with a corresponding surface of a feature in axially adjacent extruded case. Interaction between the features 90b and corresponding features of the axially adjacent extruded case limit relative movement in axial directions and in directions transverse to the axis A, as well as ensuring case to case alignment.

Figure 8:
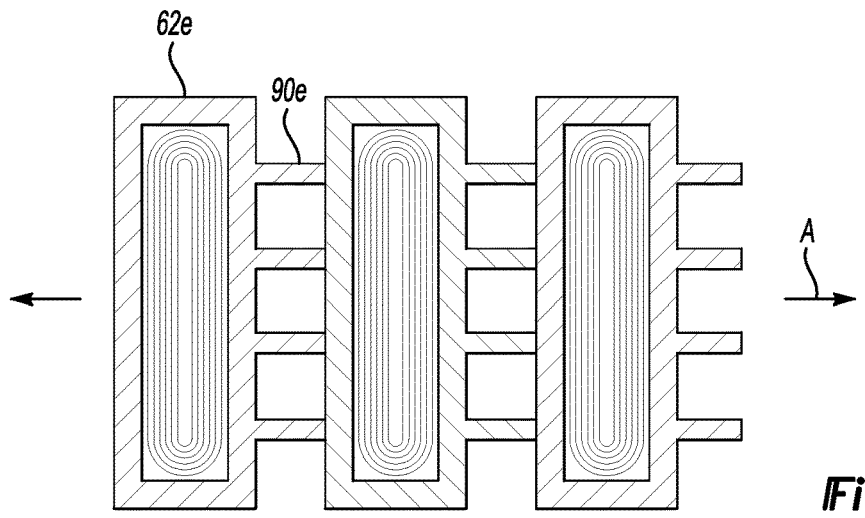
FIG. 8 shows a section view of three axially adjacent battery cells according to another exemplary embodiment.

In the example of FIG. 8, the features 90e extend from a first axial side of the extruded case 62e. In that sense, the extruded case 62e is asymmetrical. The features 90e provide a desired axial spacing between the extruded cases 62e.

Figure 9:
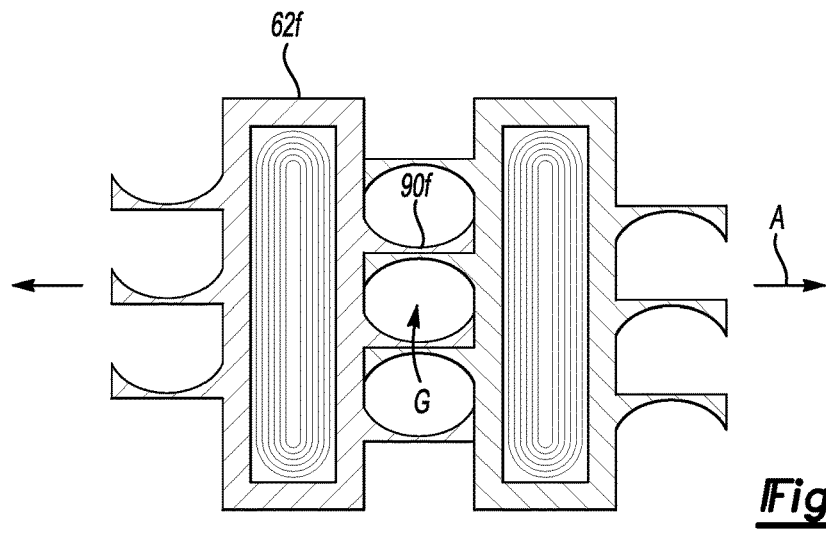
FIG. 9 shows a section view of two axially adjacent battery cells according to another exemplary embodiment.

In the example of FIG. 9, the features 90f on a first axial side of the extruded case 62f are asymmetrical with the features 90f on an opposing, second axial side of the extruded case 62f. The features 90f of the extruded case 62f interface with corresponding features of an axially adjacent extruded case 62f to provide both gaps G and a desired axial spacing between the extruded cases 62f. In this example, the gaps G have a generally cylindrical profile.

To provide the generally cylindrical profile, the features 90f of one of the extruded cases 62f has a concave profile that faces vertically downward (e.g., downward in the drawing) to interface with a concave profile in another of the extruded cases 62f that faces vertically upward. The generally cylindrical profile provides a conduit or channel that is used to communicate a temperature management fluid, such as air or a liquid, through the battery pack. The features 90f allow optimization of gaps G to communicate the temperature management fluid through the battery pack in a manner that reduces pressure drop, improves cooling efficiency, and reduces temperature variations between the battery assemblies of the battery pack. The size, shape, and topology of the features 90f can be adjusted to maximize surface area for heat transfer, while flow rate and pressure drop of the temperature management fluid can be tailored via area/volume trade-off.

Figure 10:
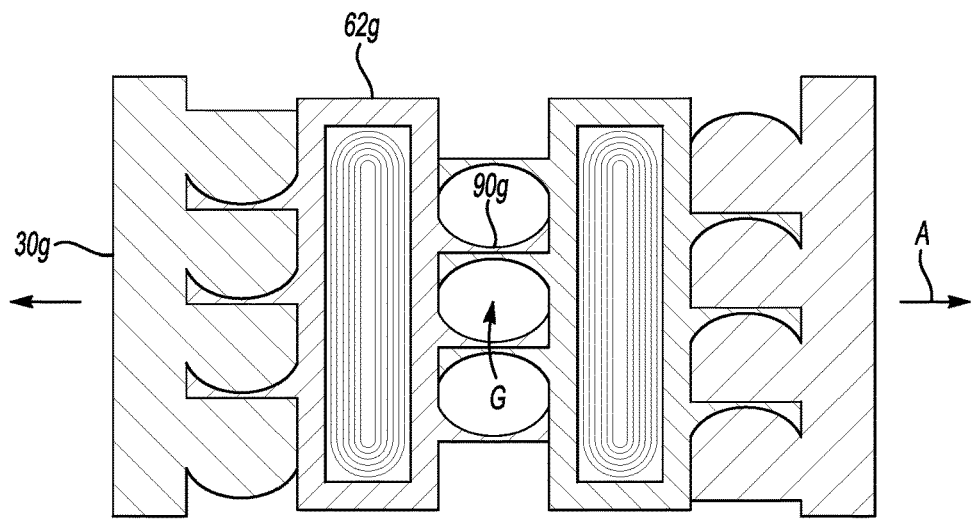
FIG. 10 shows a side view of two axially adjacent battery cells according to another exemplary embodiment.

In the example of FIG. 10, the features 90g on a first axial side of the extruded case 62g, provide both gaps G and a desired axial spacing between the extruded cases 62g. On an opposing, second axial side of at least one of the extruded cases 62g, the features 90g interconnect to the endplate 30g of the battery pack. The features 90g on a first axial side of the extruded case 62g are asymmetrical with the features 90g on the second axial side of the extruded case 62g. In this example, the features 90g are extensions that are received within corresponding grooves in the endplate 30g. In another example, extensions having the illustrated configuration could extend from the endplate 30g into grooves within the extruded case 62g. The features 90g can facilitate alignment of the extruded cases 62g and facilitate constraining the cases 62g or electrodes. The features 90g can additionally facilitate assembly by preventing installing the cases 62g in an incorrect orientation.

Figures 11, 12:
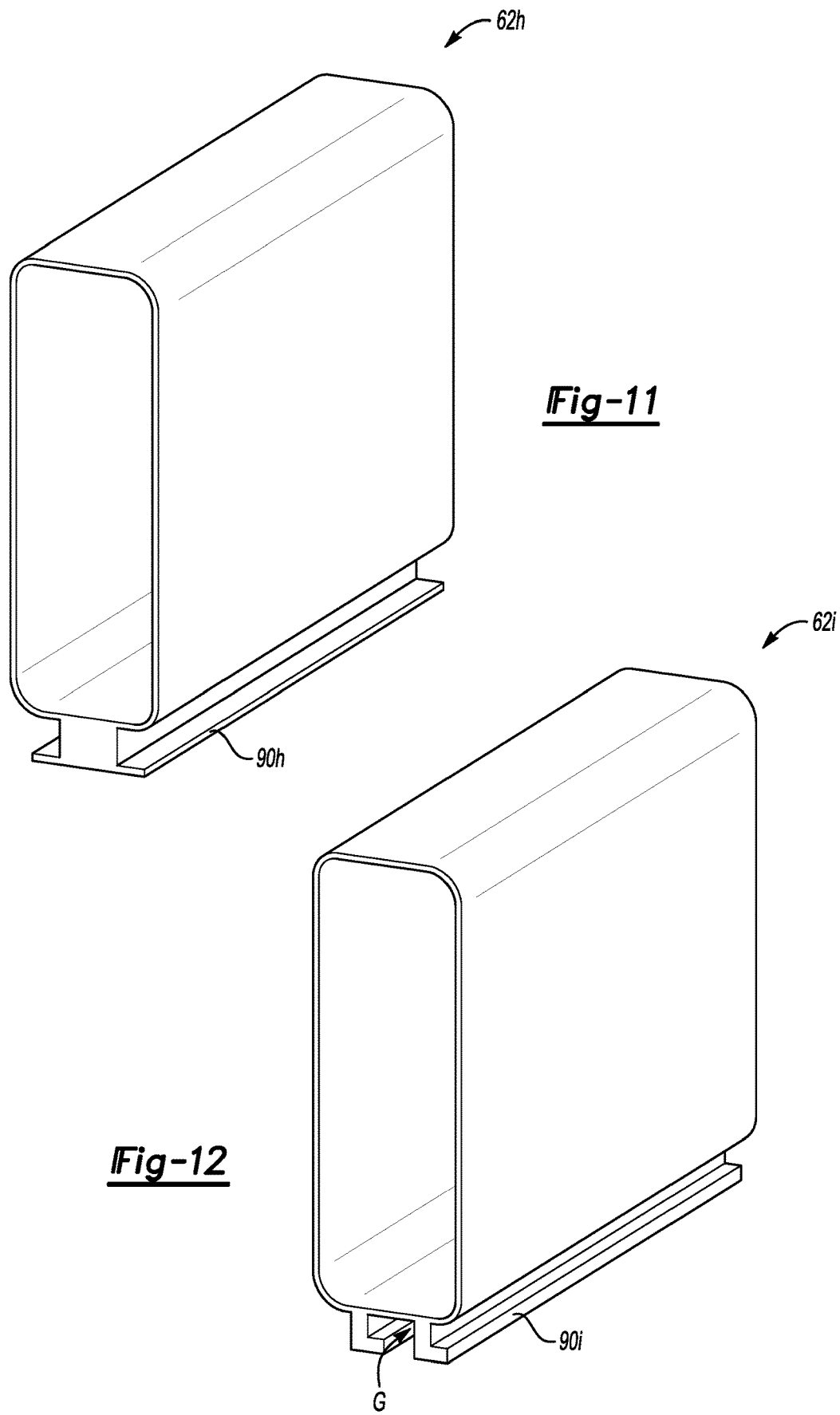
FIG. 11 shows a perspective view of another example extruded case for use in the battery cell of FIG. 3.
FIG. 12 shows a perspective view of another example extruded case for use in the battery cell of FIG. 3.

Referring now to FIG. 11, another example extruded case 62h includes a feature 90h at a vertical bottom of the extruded case 62h. The feature 90h can be used, for example, to facilitate thermal transfer between the extruded case 62h and the heat exchanger plate 34 within the battery pack. The feature 90h can be considered an attachment or alignment feature. The feature 90h can be positioned at any area of the extruded case 62h, not just the vertical bottom.

Referring now to FIG. 12, yet another example extruded case 62i has a plurality of features 90i at a vertical bottom of the extruded case 62i. The features 90i can be used to facilitate thermal transfer to the heat exchanger plate within the battery pack. The alignment features 90i could potentially establish a gap G for communicating a temperature management fluid, such as air or a liquid, through the battery pack.

Figure 13:
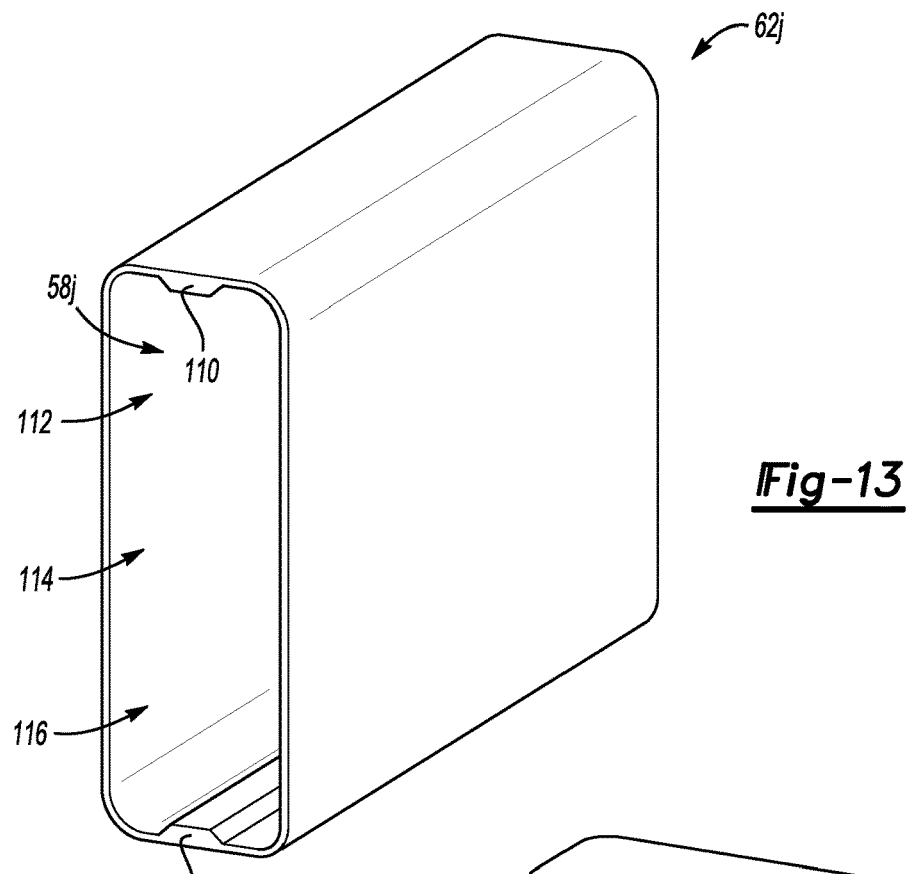
FIG. 13 shows another example extruded case for use in the battery cell of FIG. 3.

Referring to FIG. 13, still another example extruded case 62j includes a plurality of features 110 extending into the open area 58j of the extruded case 62j. In other words, the features 110 protrude from an interior wall of the extruded case 62j. The example features 110 are alignment features that can be used to hold a position of one or more electrodes within the open area 58j of the extruded case 62j. The extruded case 62j, and the other electrode cases of this disclosure could, in some examples, hold more than one electrode. The extruded case 62j, for example, could hold three separate jelly-roll electrodes stacked on top of one another, for example at locations 112, 114, and 116, respectively.

Figure 14:
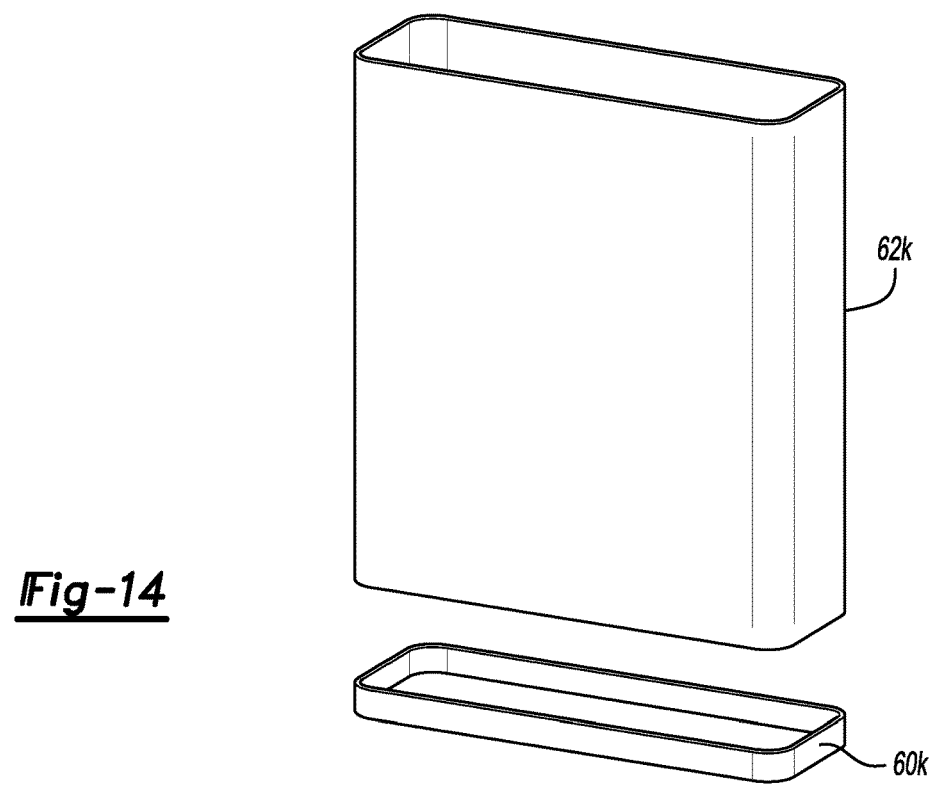
FIG. 14 shows portions of a battery cell housing having a vertical alignment.

In the examples of FIGS. 2 to 13, the extruded cases 62-62j are configured such that the open space 58 has a horizontal orientation within the battery pack. Referring now to FIG. 14, the open space 58 of the extruded case 62k of another example battery cell housing 50k has a vertical orientation. When the battery cell housing 50k is within a battery pack, the first header 66k is at a vertical bottom of the extruded case 50k, and the second header 70k is at a vertical top of the extruded case 62k. For purposes of this disclosure, vertical and horizontal are relative to ground.

Figure 15:
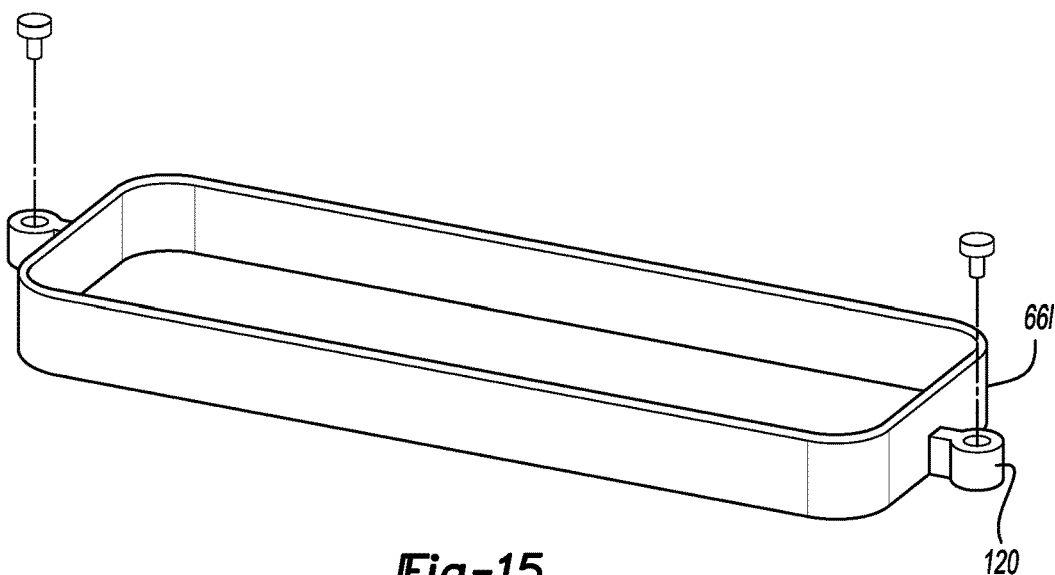
FIG. 15 shows a header suitable for use in the battery cell housing of FIG. 14.
Figure 16:
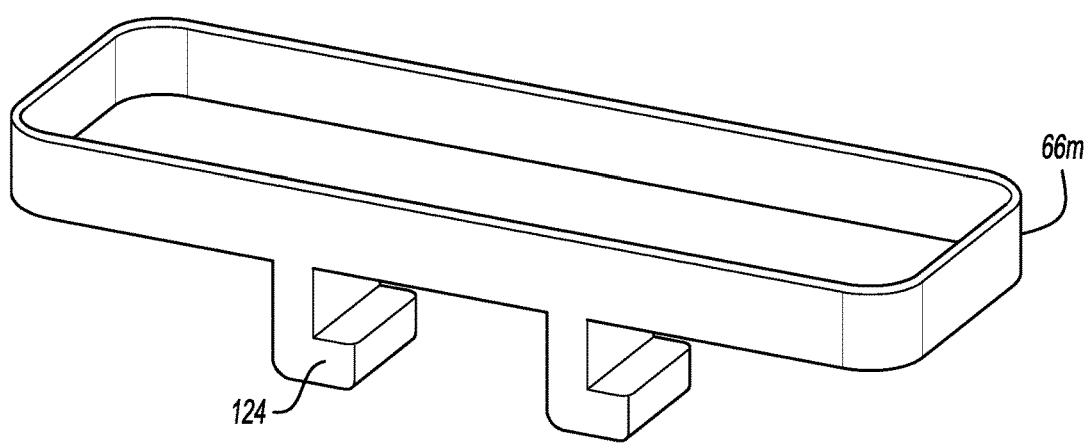
FIG. 16 shows another example header for use in the battery cell housing of FIG. 14.
Figure 17:
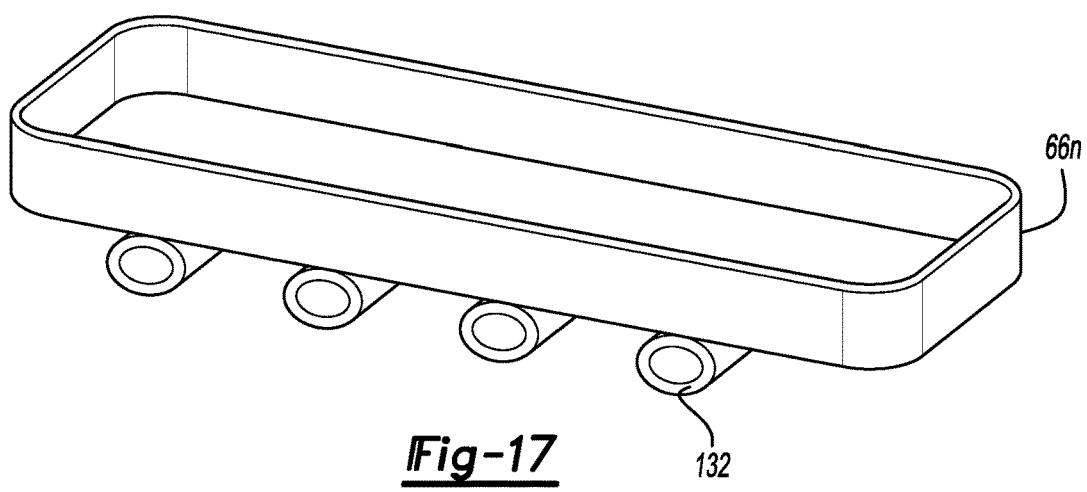
FIG. 17 shows yet another header for use in the battery cell housing of FIG. 14.

Referring to FIGS. 15 to 17, various headers 66l-66n could be used in combination with the extruded cases 62-62k. In the example of FIG. 15, the header 66l includes attachment features 120 that can be used to secure the header 66l to another distinct portion of the battery pack, such as the heat exchanger plate 34, if the header 66l is used in connection with the vertically oriented extruded case 62k of FIG. 14. The attachment features 120 could be received within a groove in the heat exchanger plate or other distinct portion of the battery pack to help secure the header 66l without separate mechanical fasteners. The attachment features 120 can enhance thermal transfer without relying on, for example, thermal greases or a separate interface media that can degrade over time. The attachment features 120 could also provide a groove that receives an extension from the other distinct portion of the battery pack. The attachment features 120 can be designed so that the associated battery assembly has relatively uniform spacing to other distinct portions of the battery pack.

In the example of FIG. 16, the header 66m includes features 124 to facilitate intimate contact of the header 66m to the heat exchanger plate 34 as well as maintain alignment and facilitate assembly (e.g. act as a positioning feature during assembly). The spacers 124 could, for example, be received within a groove of the heat exchanger plate, or could establish a groove that receives a protrusion of the heat exchanger plate.

In the example of FIG. 17, the header 66n includes conduits 132 used to communicate a temperature management fluid, for example, through portions of the battery pack.

Figure 18:
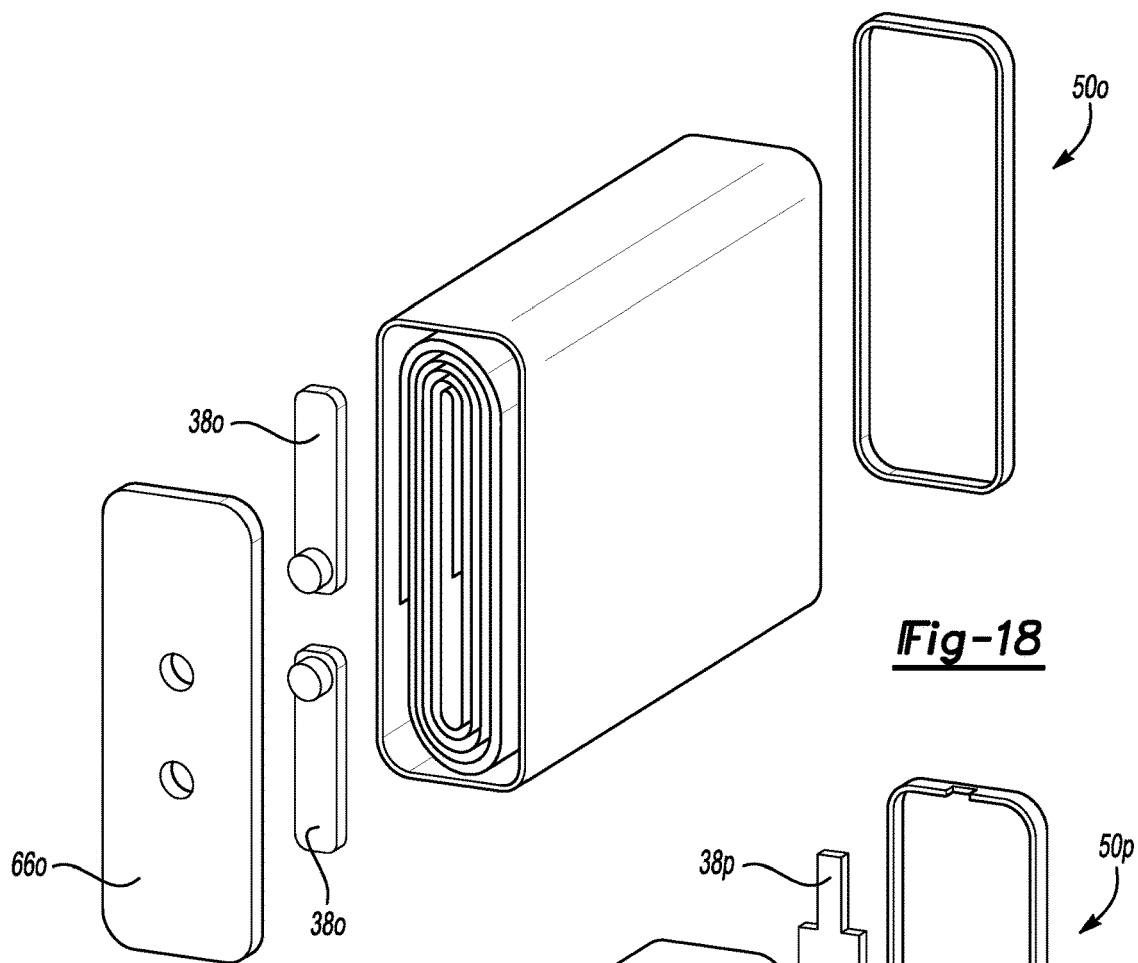
FIG. 18 shows an exploded view of a battery cell having terminals at a lateral side.
Figure 19:
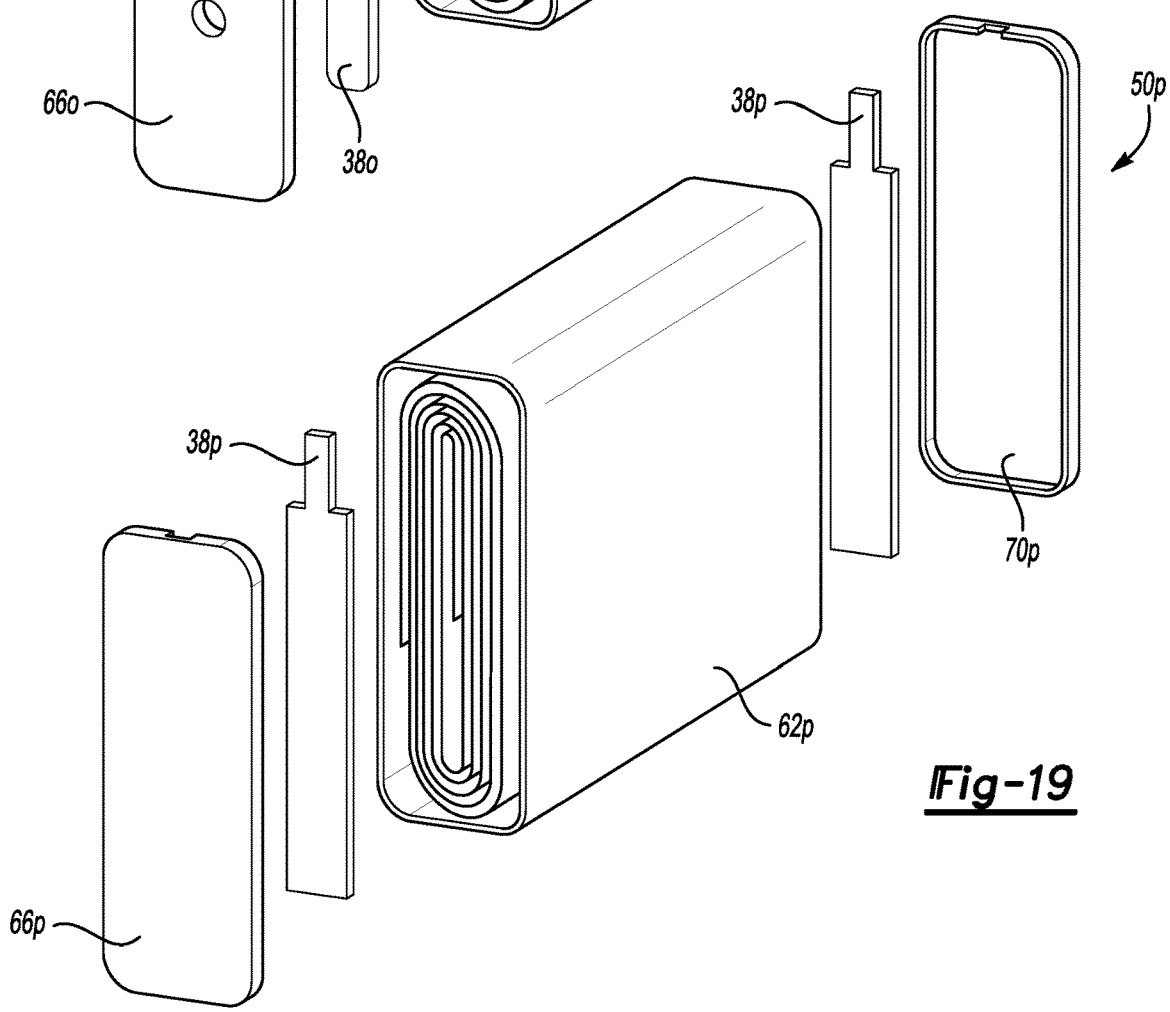
FIG. 19 shows a perspective exploded view of another example battery cell having a terminal on a first lateral side and a second terminal on an opposing lateral side.

Referring now to FIGS. 18 to 20, because the extruded cases 62-62k use two headers, the terminals can be positioned in many different locations and configurations without requiring extensive design changes.

In the example of FIG. 18, the terminals 38o of the battery cell 26o both extend through the same header 66o of a battery cell housing 50o.

In the example of FIG. 19, one of the terminals 38p of the battery cell 26p extends through an interface between the header 66p and the extruded case 62p, and another one of the terminals 38p of the battery cell 26p extends through an interface between the header 70p and the extruded case 62p. The terminals 38p of the battery cell 26p are disposed on opposite ends of the battery cell 26p.

In the example of FIG. 20, one of the terminals 38q of the battery cell 26q extends through an aperture 174 in the first header 66q, and another one of the terminals 38q of the battery cell 26q extends through an aperture 178 in the second header 70q. The terminals 38q of the battery cell 26q are disposed on opposite ends of the battery cell 26q.

Features of some of the disclosed embodiments include an extruded case design that can optionally incorporate features facilitating alignment, temperature management, and structural integrity. The extrusion process can accommodate relatively complex unidirectional wall profiles. Ensuring alignment of the battery assemblies can enable more consistent connections between the terminals of the battery assemblies and a bus bar, for example, which lower piece to piece variations in electrical resistance through those connections. The example embodiments can reduce overall part counts, assembly complexity, assembly time, and provide enhanced array alignment retention over a life of the battery pack. The features can provide assembly error proofing functionality by preventing the extruded case from being installed in an incorrect orientation.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A battery assembly, comprising:
a first extruded case that provides an open area, the first extruded case including an alignment feature; and an electrode of a battery pack of an electrified vehicle, the electrode held within the open area, wherein the first extruded case is configured to be disposed with a second extruded case along an axis of the battery pack, wherein the alignment feature extends from a surface of the first extruded case that is transverse to the axis, wherein the alignment feature is configured to contact the second extruded case to provide a gap between the first extruded case and the second extruded case, the gap having a perimeter at least partially provided by the first extruded case and at least partially provided by the second extruded case.

2. The assembly of claim 1, wherein the alignment feature is a first alignment feature that is configured to directly contact a second alignment feature of the second extruded case.

3. A battery pack assembly, comprising:
a battery cell of a battery pack of an electrified vehicle, the battery cell including an extruded case and an electrode, wherein the extruded case provides an open area that holds the electrode,
an alignment feature of the extruded case, the alignment feature configured to interconnect with a distinct portion of the battery pack to limit movement of the extruded case relative to the distinct portion; and
an endplate that compresses the battery cell and other battery cells along an axis, wherein the distinct portion of the battery pack is an alignment feature of the endplate.

4. The assembly of claim 1, wherein the alignment feature extends from an outer surface of the first extruded case that faces away from the open area, the alignment feature having an alignment surface that is transverse to the outer surface and interfaces with the second extruded case.

5. The assembly of claim 1, wherein the alignment feature is first alignment feature on a first axial side of the first extruded case and the first extruded case further comprises a second alignment feature on a second axial side of the first extruded case, the first alignment feature asymmetrical with the second alignment feature.

6. The assembly of claim 1, wherein the gap provides a conduit configured to carry a temperature management fluid within the battery pack.

7. The assembly of claim 6, wherein the alignment feature has a conduit surface that is transverse to the outer surface and is configured to directly contact the temperature management fluid within the gap, wherein an alignment feature of the second extruded case has a conduit surface that is also configured to directly contact the temperature management fluid within the gap.

8. A battery pack assembly, comprising:
a plurality of battery cells disposed along an axis, the battery cells each including a extruded case that provides an open area, and an electrode held within the open area;
the extruded case comprising an extruded feature configured to directly engage a heat exchanger plate disposed adjacent the plurality of battery cells.

9. The assembly of claim 1, wherein the electrode is folded and wound about an electrode axis, and the first extruded case is extruded in a direction aligned with the electrode axis.

10. The assembly of claim 1, comprising a first header secured to a first end portion of the first extruded case, and a second header secured to an opposing, second end portion of the first extruded case, the first and second header, when secured, enclosing the electrode within the open area.

11. The assembly of claim 1, wherein the first extruded case comprises an extruded electrode positioning feature extending into the open area and configured to align the electrode.

12. The assembly of claim 1, wherein the alignment feature is a continuous and monolithic portion of the first extruded case.

13. The assembly of claim 1, wherein the alignment feature is integrated together with other portions of the first extruded case.

14. The assembly of claim 1, further comprising a temperature management fluid within the gap.

15. The assembly of claim 10, wherein the first and second header, when secured completely enclose the electrode within the open area.

16. The battery assembly of claim 1, wherein the first alignment feature is configured to contact the second extruded case without axially overlapping any portion of the second extruded case.

17. The battery assembly of claim 1, wherein the alignment feature is a first alignment feature and the surface is a first surface, wherein the first extruded case includes a second alignment feature extending from a second surface, the second alignment feature and the second surface on an opposite axial side of the first extruded case from the first alignment feature and the first surface, wherein the second alignment feature is configured to interconnect to an endplate of the battery pack.

18. The battery assembly of claim 17, wherein the first alignment feature is configured to contact the second extruded case without axially overlapping any portion of the second extruded case.

19. The battery assembly of claim 17, where the second alignment feature is configured to axially overlap with a portion of the endplate when interconnected to the endplate.

20. The battery pack assembly of claim 8, wherein the heat exchanger plate is disposed adjacent the plurality of battery cells without extending axially between any of the plurality of battery cells.

* * * * *